US 8,177,485 B2

(12) United States Patent
Ko

(10) Patent No.: US 8,177,485 B2
(45) Date of Patent: May 15, 2012

(54) CROSS FLOW FAN STRUCTURE

(76) Inventor: Chen-Hui Ko, Taoyuan Hsien (TW)

( * ) Notice: Subject to any disclaimer, the term of this patent is extended or adjusted under 35 U.S.C. 154(b) by 690 days.

(21) Appl. No.: 12/318,170

(22) Filed: Dec. 23, 2008

(65) Prior Publication Data

US 2010/0158664 A1    Jun. 24, 2010

(51) Int. Cl.
*F04D 5/00* (2006.01)
*F04D 29/56* (2006.01)
(52) U.S. Cl. ............... 415/53.1; 415/119; 416/244 R
(58) Field of Classification Search .......... 415/53.1, 415/53.2, 53.3, 119, 213.1, 214.1; 416/178, 416/184, 244 R
See application file for complete search history.

(56) References Cited

U.S. PATENT DOCUMENTS

| 8,007,225 B2 * | 8/2011 | Ko ............... 415/53.1 |
| 2006/0233638 A1 * | 10/2006 | Chen ............ 415/53.1 |
| 2009/0067982 A1 * | 3/2009 | Ko ............... 415/53.1 |
| 2011/0033325 A1 * | 2/2011 | Ko ............ 417/423.15 |

* cited by examiner

*Primary Examiner* — Dean O Takaoka
(74) *Attorney, Agent, or Firm* — Rosenberg, Klein & Lee

(57) ABSTRACT

A cross flow fan structure comprising: a) a housing integrally formed by plastic material in an injection molding process; b) a cross flow fan integrally formed by plastic material in an injection molding process, the right side of the cross flow fan having a mounting hole in axial direction and a damping/positioning body; c) a motor with an end portion attached to a mounting base whereupon the motor is attached to the housing by use of the mounting base in such a way that the driving shaft of the motor is extended into the mounting hole of the damping/positioning body in a tightly clamping state for driving the cross flow fan in rotational operation. In this way, a cross flow fan module made by material is created. Moreover, a convenient assemble and a vibration resisting effect are achieved for a smooth operation with low noise by use of a skillful combination of the material and by a special structure.

6 Claims, 11 Drawing Sheets

CROSS FLOW FAN STRUCTURE

BACKGROUND OF THE INVENTION

1. Field of the Invention

The invention relates to a cross flow fan, and more particularly to a cross flow fan applicable but not limited to a panel meter of a fitness equipment, and the cross flow fan and its housing are made of a plastic material.

2. Description of the Related Art

As exercisers often sweat a lot when working on fitness equipments, it is delightful to have steady cool air blowing directly at the exercisers while they are doing exercises. Referring to FIG. 1 for a conventional treadmill machine M, the treadmill machine M includes an axial flow fan installed separately on both sides of a panel meter, and the airflow direction of this type of fan is parallel to the axle. In other words, air is flowing upward instead of blowing directly at an exerciser on the treadmill machine, and such arrangement obviously requires improvements.

Referring to FIGS. 2 and 3 for schematic views of a conventional cross flow fan assembly, the assembly comprises a housing 11, a motor 12 and a cross flow fan 13. The inventor of the present invention attempts to install a conventional cross flow fan 10 in a panel meter of a treadmill machine to replace the traditional axial flow fan F, but the following drawbacks are still found in its testing procedure:

1. The housing 11 and the cross flow fan 13 of the structure of a conventional cross flow fan 10 are made of metal plates, and the housing 11 is manufactured by stamping, riveting and coupling at least four metal plates. With the weight limitation, the metal plates cannot be too thick, and thus the structural strength of the assembled housing 11 is poor.

2. More importantly, the cross flow fan 13 is made by riveting and coupling metal plates and metal pillars. As shown in FIGS. 2 and 2A, over ten metal vanes 131 are embedded into the metal panels 132, 133 having grooves disposed on left and right sides, and then the middle of the left metal panel 132 is riveted with a bushing 133 connected to an axle 121 of the motor 12, and the middle of the right metal panel 134 is riveted with a center shaft 135. After a center shaft 135 is sheathed into a sleeve 14, the center shaft 135 is installed to the housing 11 by an axial positioning base 15. However, most of these cross flow fans 10 are made of metals, and most of the connections are achieved by stamping, riveting and welding, and thus the manufacture is more complicated, and the required streamline design cannot be achieved easily. If the cross flow fan 13 is driven by the motor 12 to rotate transversally in the x-x direction as shown in FIG. 3, and the length L of the cross flow fan 11 is slender, the circularity of the riveted metal vanes 131 will be affected, and the operation of the fan will become unsmooth, and thus such fan is not suitable to be installed in the panel meter of the fitness equipment. Although the problems created by the metal material and its rivet connection do not affect the usage of industrial products, yet the prior art is not suitable to be used in a panel meter installed with precision electronic components.

In view of the shortcomings of the prior art, the inventor of the present invention based on years of experience in the related industry to conduct extensive researches and experiments, and finally developed a stable cross flow fan for a fitness equipment to overcome the aforementioned shortcomings.

SUMMARY OF THE INVENTION

An object of the invention is to provide a cross flow fan structure wherein its housing and cross flow fan are made of a plastic material and skillfully assembled into a plastic cross flow fan module. The invention not only ensures a quick and convenient assemble, but also enhances the overall strength and the operation of the fan.

Another object of the invention is to provide a cross flow fan structure wherein the cross flow fan comes with a vibration resisting design for preventing vibrations and reducing noises, and thus the cross flow fan is applicable for fitness equipments.

In order to achieve the above-mentioned object, a cross flow fan structure in accordance with the invention includes:

a) a housing integrally formed by plastic material in an injection molding process, the housing having a left side plate, a right side plate, and an L-shaped air deflector disposed between both side plates, the left side plate having a first mounting hole while the right side plate has a second mounting hole with a greater diameter, a flange being formed at the rim of the second mounting hole;

b) a first damping/positioning body having a shaft sleeve and a cushioning rubber sleeve, the cushioning rubber sleeve enclosing the shaft sleeve in such a way that the mounting hole is exposed at the internal side of the first damping/positioning body, the cushioning rubber sleeve further having a ring groove for a practical installation of the cushioning rubber sleeve within the first mounting hole;

c) a cross flow fan integrally formed by plastic material in an injection molding process, the left side of the cross flow fan having a metal shaft fitting into the shaft sleeve, the right side of the cross flow fan having a third mounting hole in axial direction;

d) a second damping/positioning body made of rubber and tightly fitting into the third mounting hole of the cross flow fan, a flange being positioned at the external side of the second damping/positioning body while a mounting hole is provided in axial direction;

e) a motor having a shaft holder and a projecting driving shaft at a end face thereof, at least one positioning hole being provided at both sides of the shaft holder;

f) a mounting base having a mounting face disposed at the internal side thereof and corresponding to the flange of the second mounting hole, the external side of the mounting base having a ring seat with the same outer diameter of the motor for mounting the front part of the motor, the mounting face having a mounting hole at the center thereof for mounting the shaft holder of the motor in place, the periphery of the mounting hole having a locking hole corresponding to the positioning hole of the motor, the mounting base and the motor being secured together by screwing a screw through the locking hole into the positioning hole from the internal side toward the external side whereupon the mounting face of the mounting base is mounted on the flange by screwing a screw from the external side toward the internal side in place, the driving shaft of the motor being extended into the mounting hole of the second damping/positioning body in a tightly clamping state for driving the cross flow fan in rotational operation, whereby a cross flow fan module made by plastic material is created.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

Figure 1:
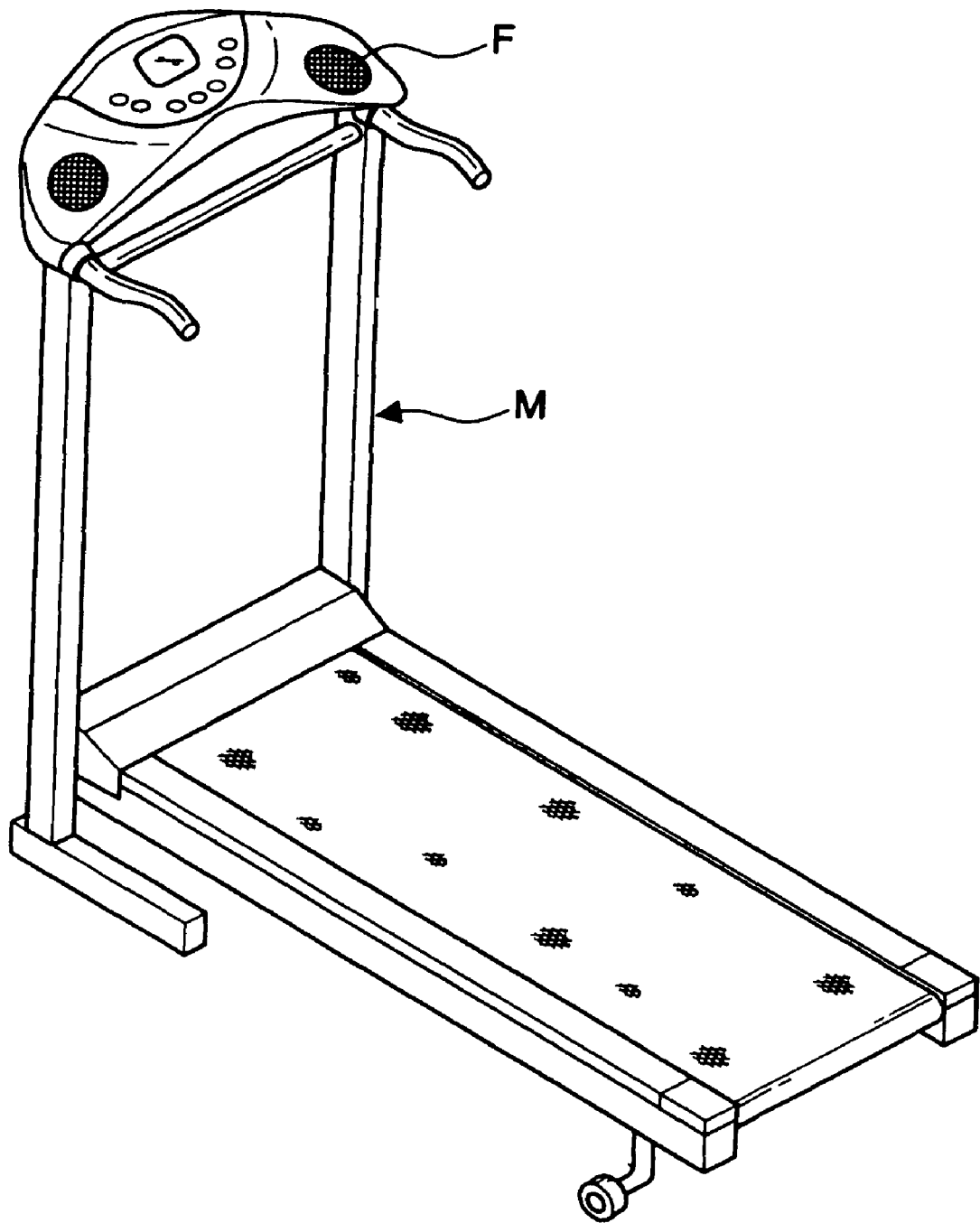
FIG. 1 is a schematic view of a conventional treadmill machine installed with an axial fan.
Figure 2:
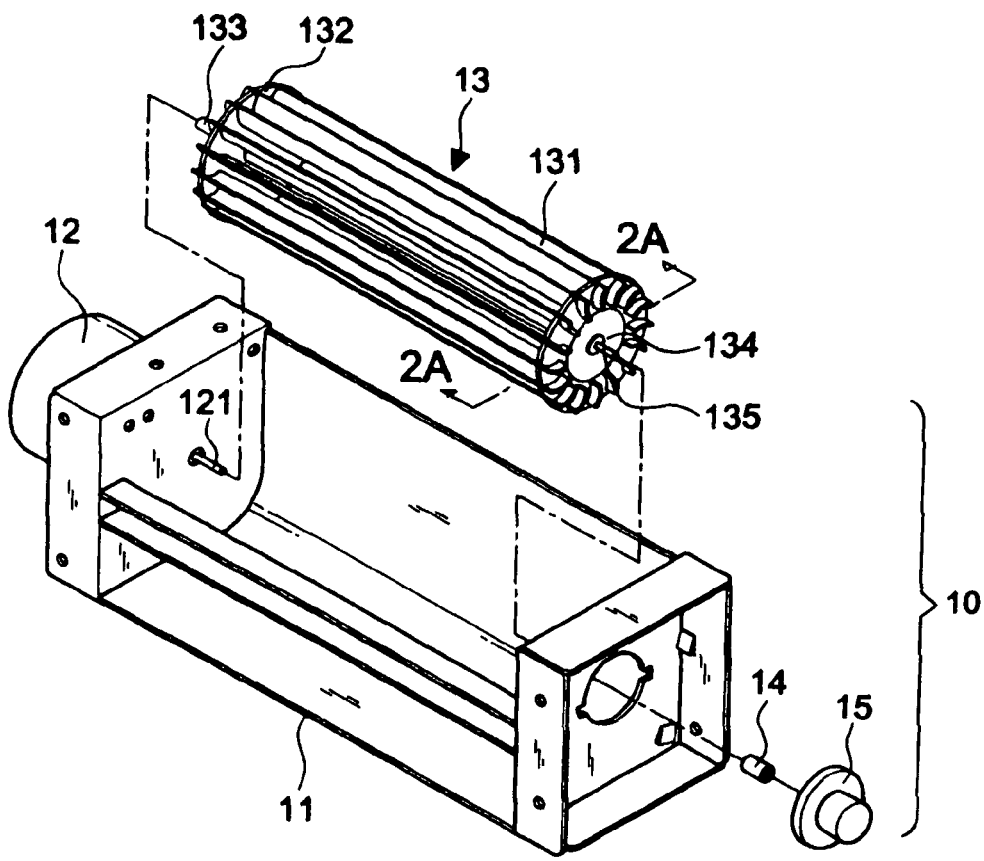
FIG. 2 is an exploded perspective view of a conventional cross flow fan.
Figure 2A:
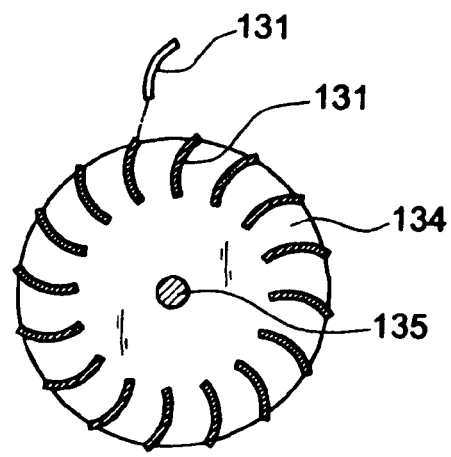
FIG. 2A is a cross-sectional view taken along the line 2A-2A as depicted in FIG. 2.
Figure 3:
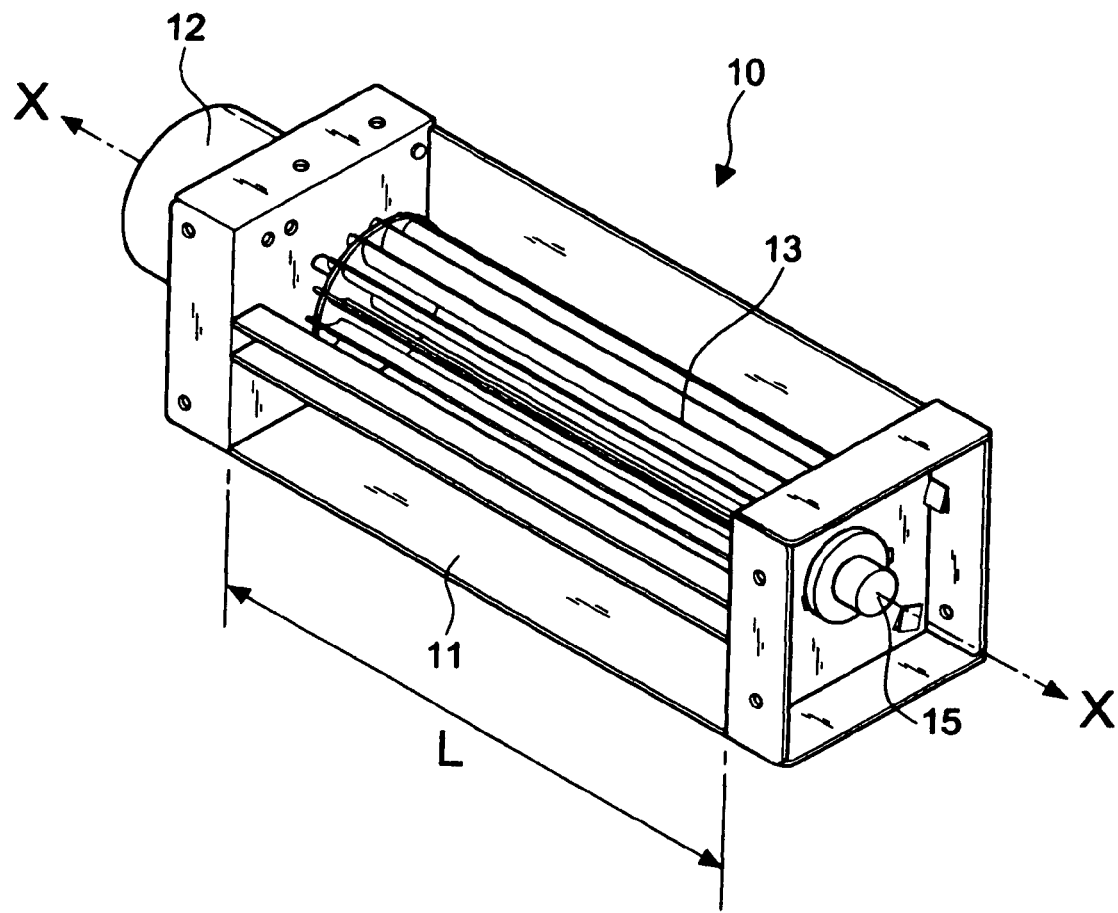
FIG. 3 is a perspective view of a conventional cross flow fan assembly.
Figure 4A:
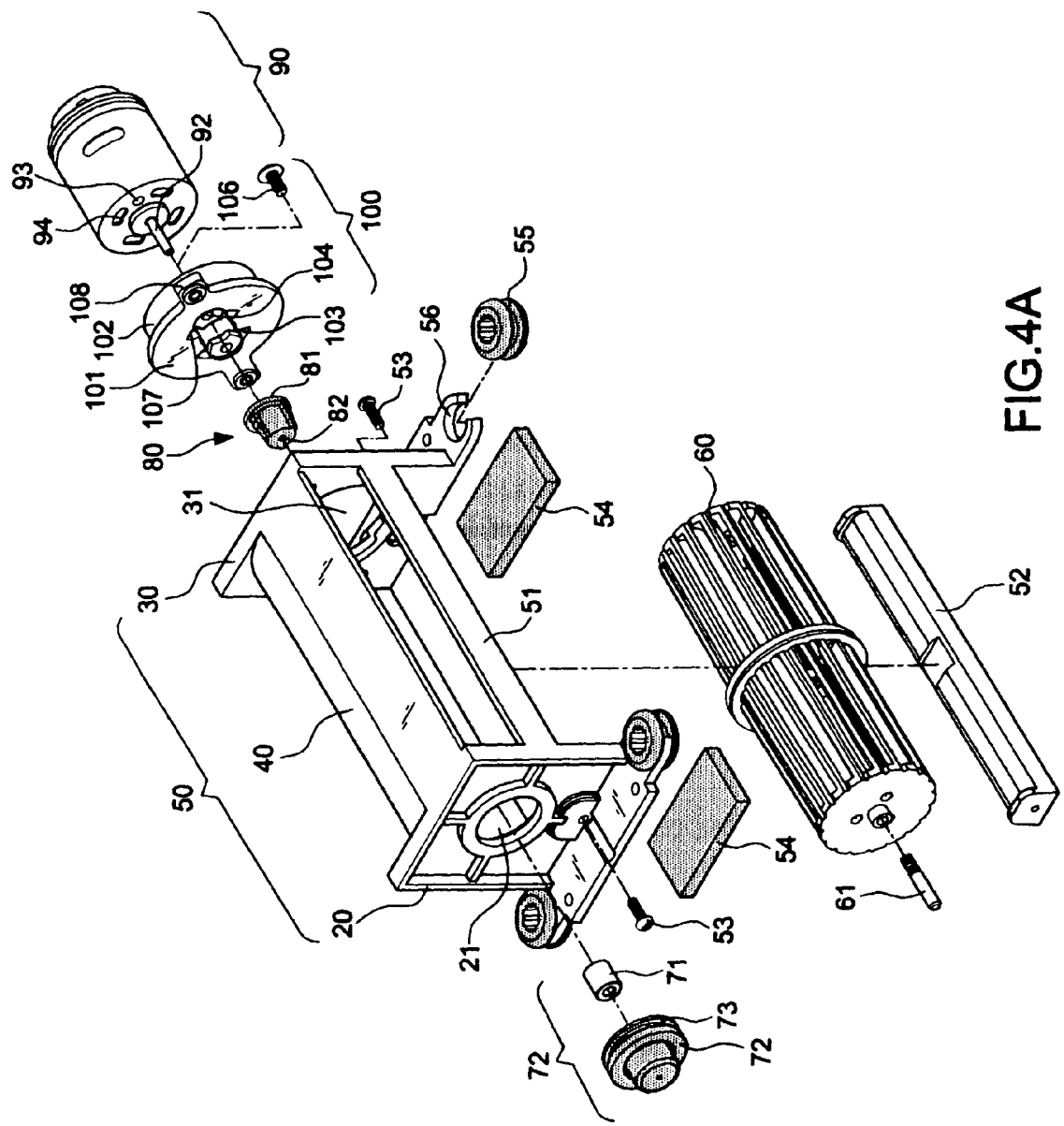
FIG. 4A is an exploded perspective view of the present invention.
Figure 4B:
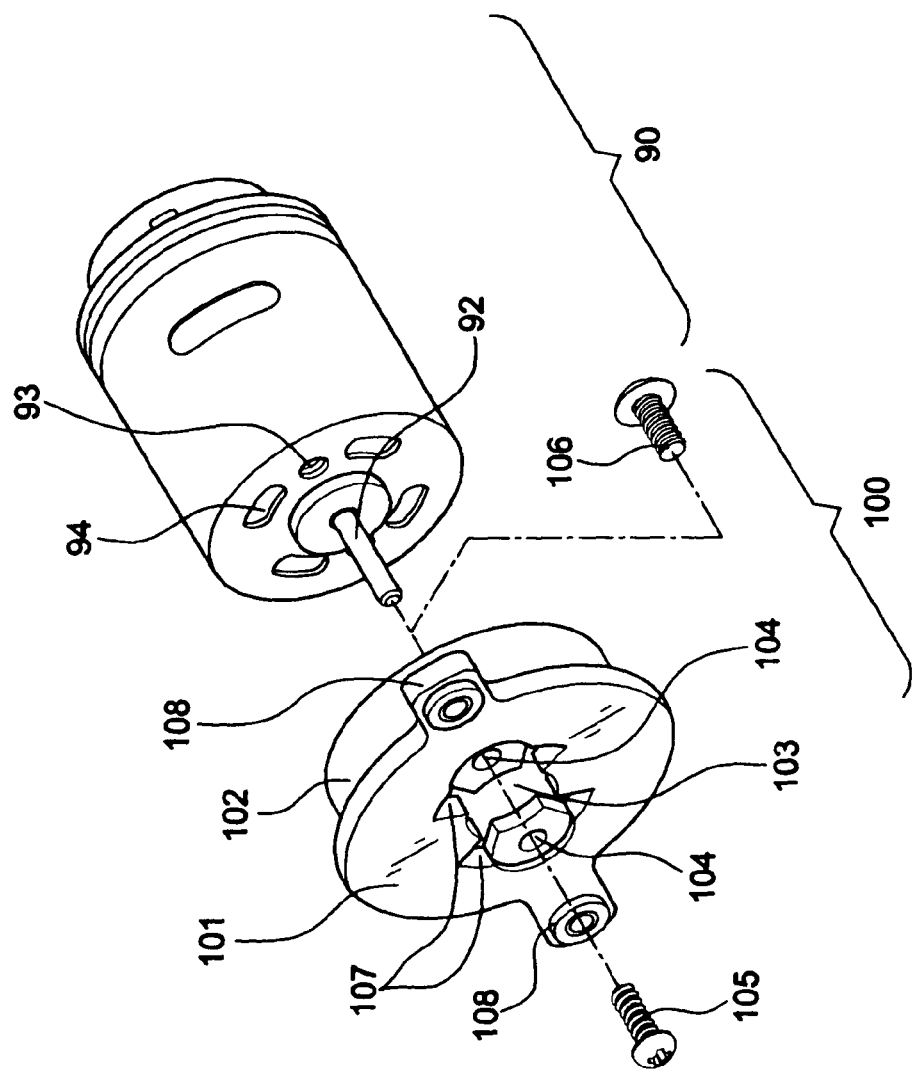
FIG. 4B is an exploded perspective view of the present invention with partial components in FIG. 4A in enlarged illustration.
Figure 5:
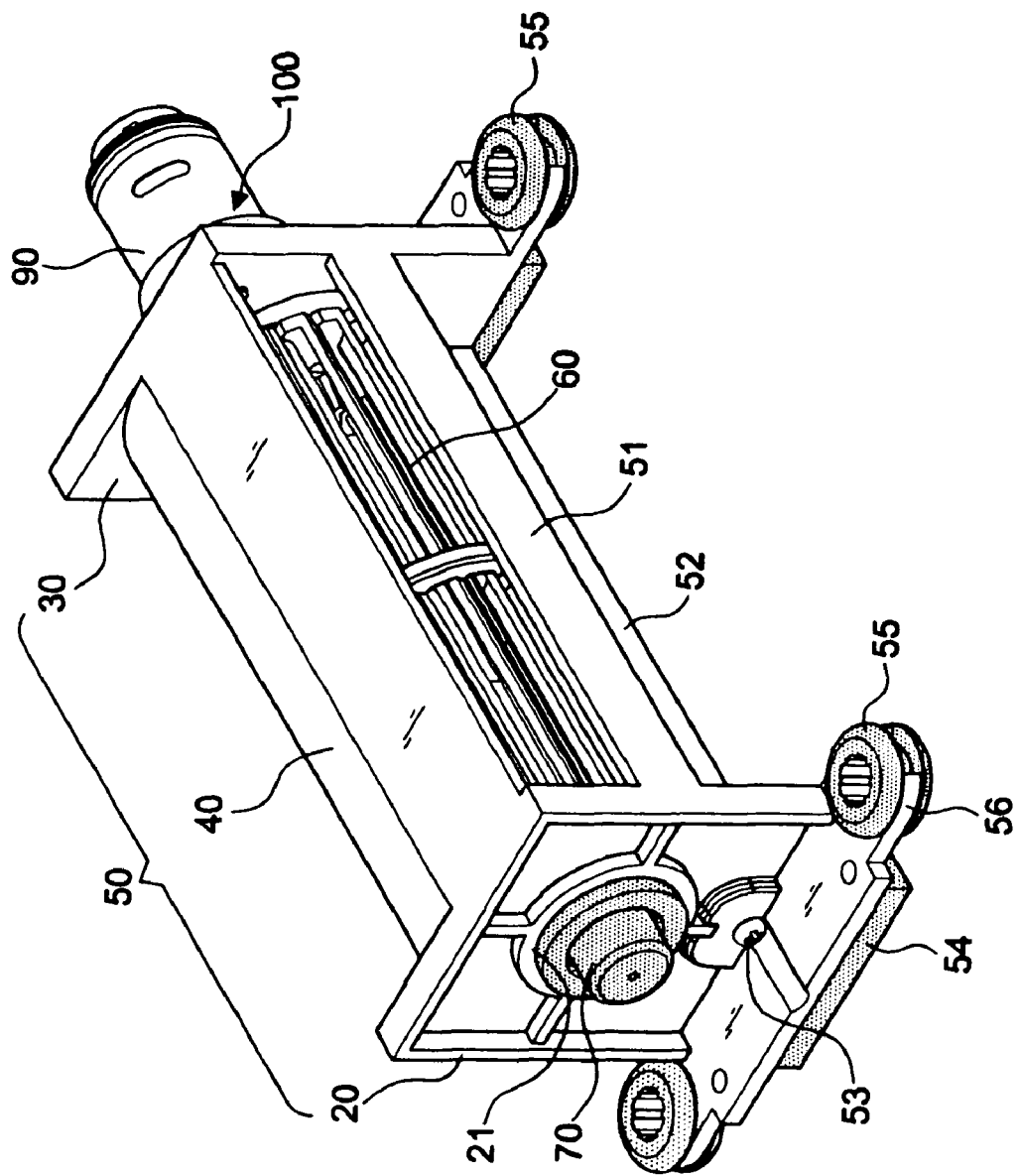
FIG. 5 is a perspective view of an assembly of the present invention.
Figure 6:
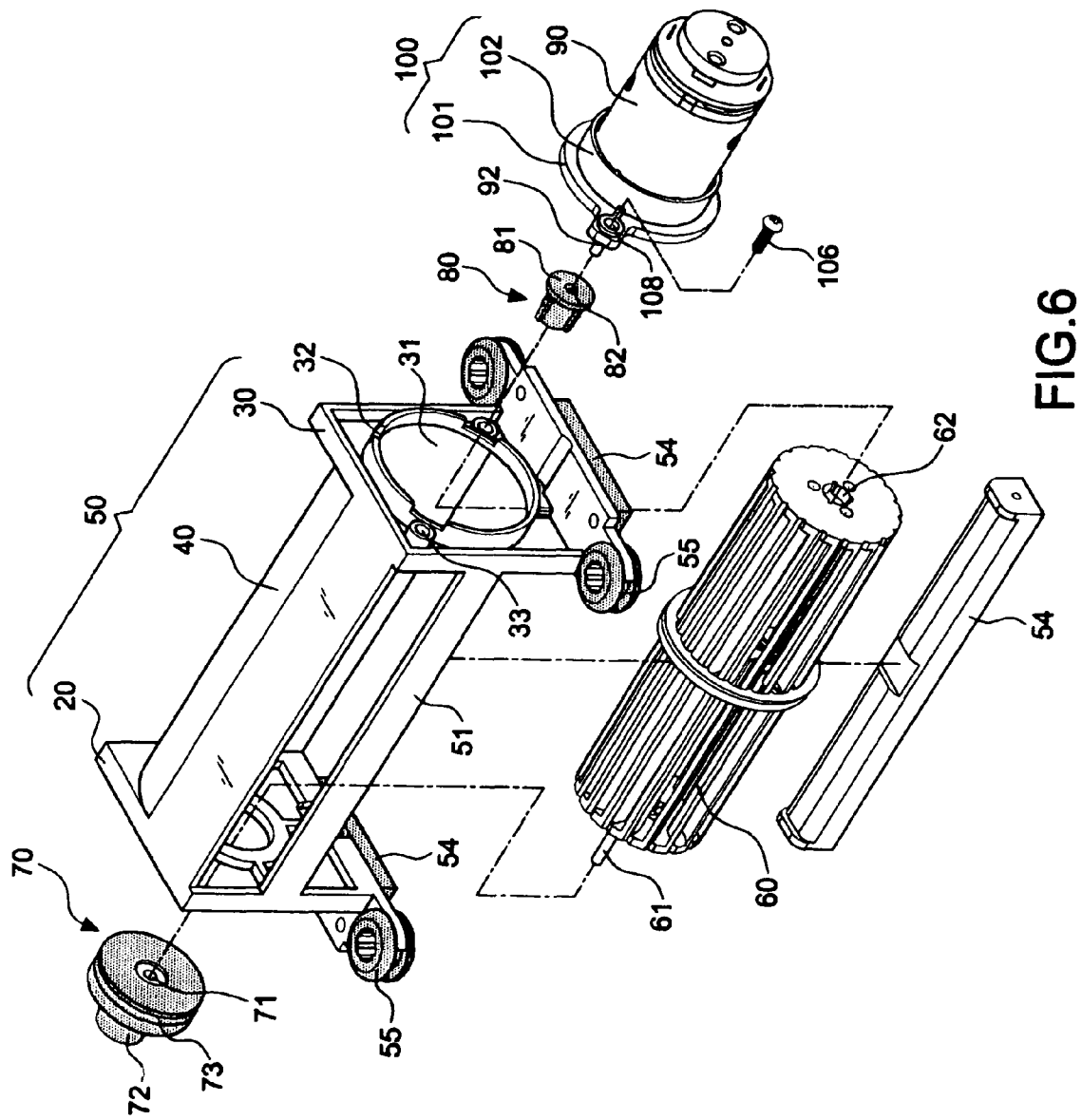
FIG. 6 is an exploded perspective view of the present invention seen from the other side.
Figure 7:
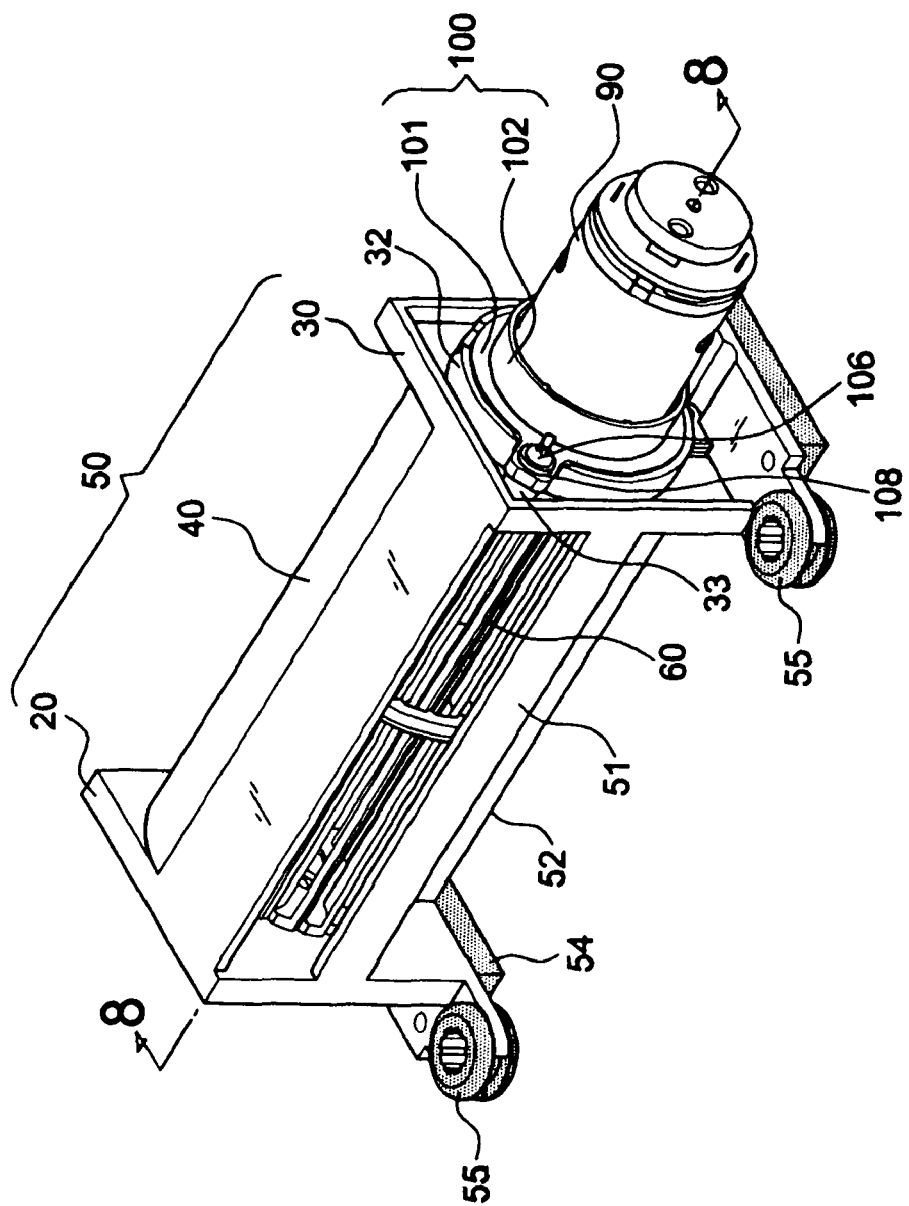
FIG. 7 is a perspective view of an assembly of the present invention seen from the other side.
Figure 8:
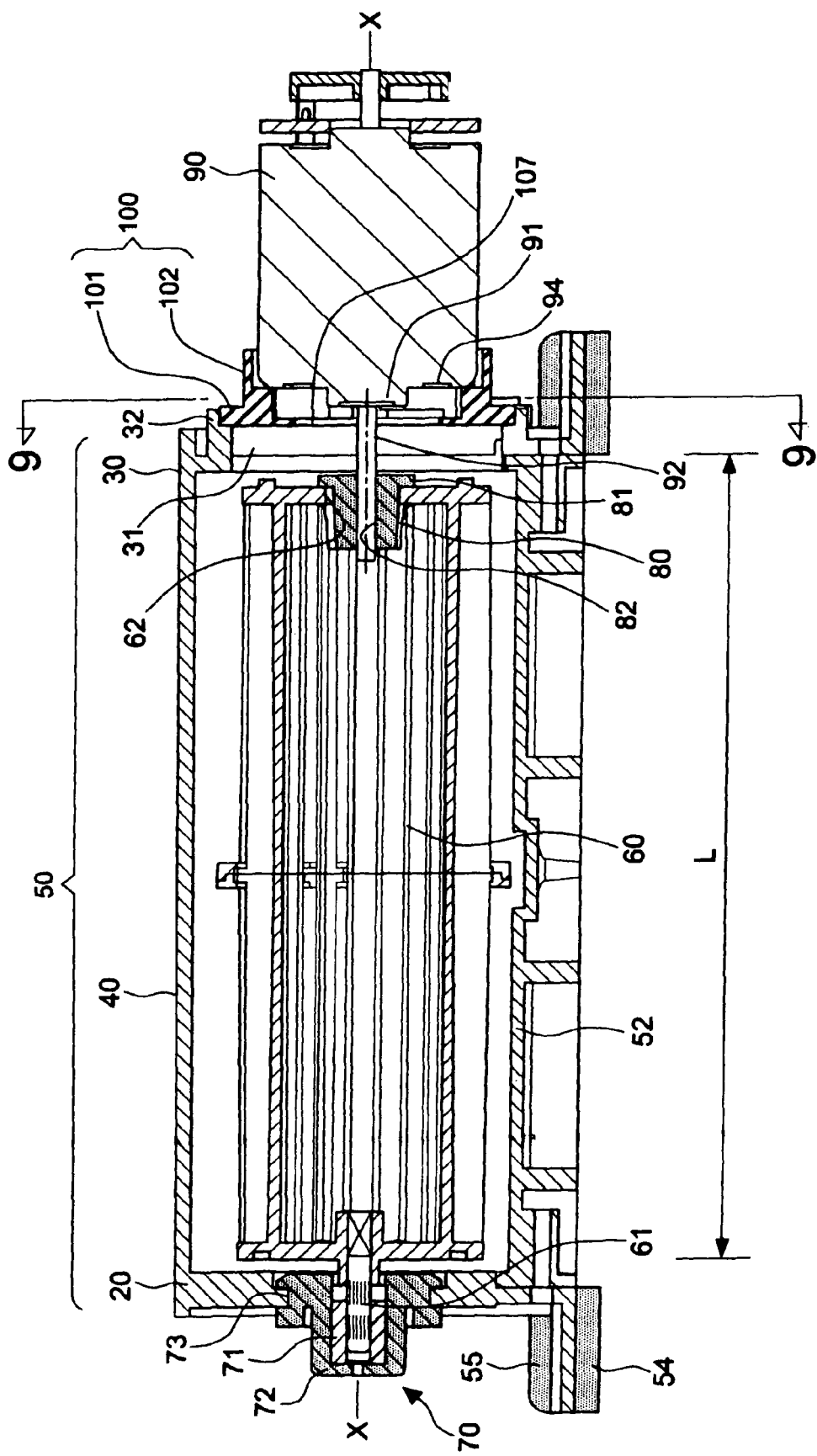
FIG. 8 is a cross-sectional view taken along the line 8-8 as depicted in FIG. 7.
Figure 9:
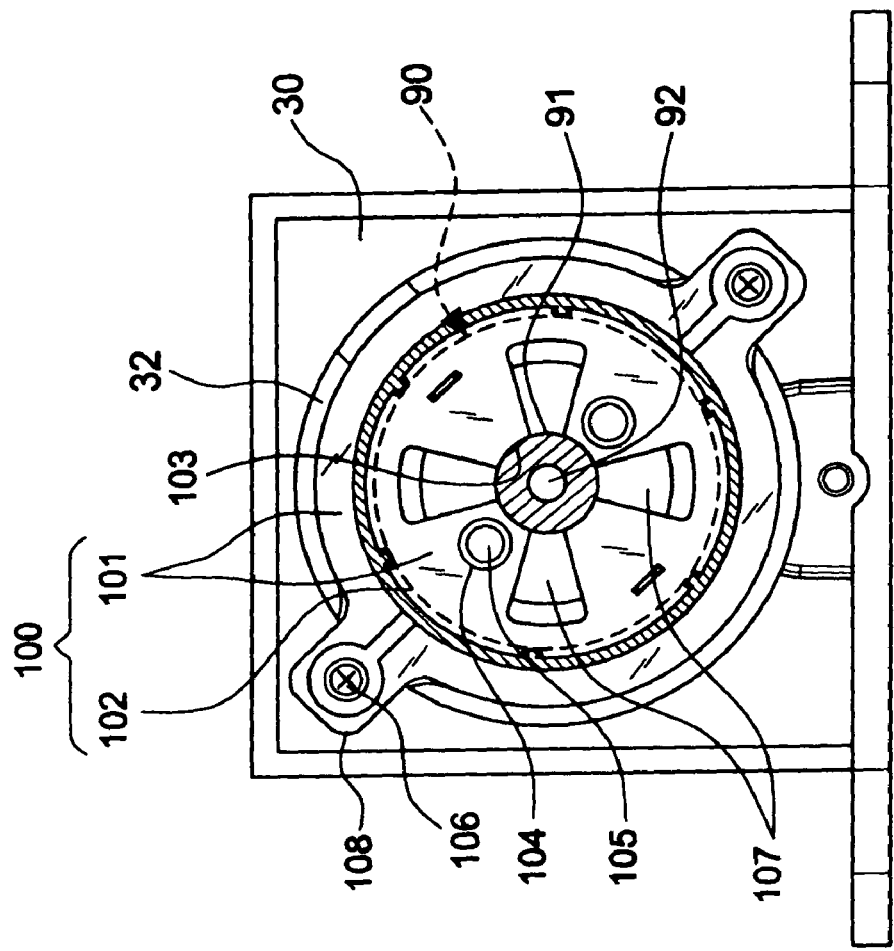
FIG. 9 is a cross-sectional view taken along the line 9-9 as depicted in FIG. 8.

First of all, referring to FIGS. 4A, 4B, 5, 6, 7 and 8, a preferred embodiment in accordance with of the invention includes a housing 50, a first damping/positioning body 70, a cross flow fan 60, a second damping/positioning body 80, a motor 90, and a mounting base 100.

The housing 50 is integrally formed by plastic material in an injection molding process. The housing 50 includes a left side plate 20, a right side plate 30, and an L-shaped air deflector 40 disposed between both side plates. According to a preferred embodiment, the L-shaped air deflector 40 is formed in an arched shape for achieving a smooth flow guide. Moreover, a cross rib 51 is integrally formed at the front side of the L-shaped air deflector 40 between the left and right side plates 20, 30 for strengthening the structure of the housing 50. In addition, the left side plate 20 includes a first mounting hole 21 while the right side plate 30 has a second mounting hole 31 with a greater diameter. A flange 32 is formed at the rim of the second mounting hole 31 (see FIGS. 6 through 8).

The first damping/positioning body 70 includes a shaft sleeve 71 and a cushioning rubber sleeve 72. The cushioning rubber sleeve 72 encloses the shaft sleeve 71 in such a way that the mounting hole is exposed at the internal side of the first damping/positioning body 70. The cushioning rubber sleeve 72 further includes a ring groove 73 for a practical installation of the cushioning rubber sleeve within the first mounting hole 21.

The cross flow fan 60 is integrally formed by plastic material in an injection molding process. The left side of the cross flow fan 60 includes a metal shaft 61 fitting into the shaft sleeve 71. The right side of the cross flow fan 60 includes a third mounting hole 62 in axial direction.

The second damping/positioning body 80 is made of rubber and tightly fits into the third mounting hole 62 of the cross flow fan 60. A flange 81 is positioned at the external side of the second damping/positioning body 80 while a mounting hole 82 is provided in axial direction.

The motor 90 includes a shaft holder 91 and a projecting driving shaft 92 at an end face thereof. At least one positioning hole 93 is provided at both sides of the shaft holder 91.

The mounting base 100 includes a mounting face 101 disposed at the internal side thereof and corresponding to the flange 32 of the second mounting hole 31. The external side of the mounting base 100 includes a ring seat 102 with the same outer diameter of the motor 90 for mounting the front part of the motor. The mounting face 101 includes a mounting hole 103 at the center thereof for mounting the shaft holder 91 of the motor in place. The periphery of the mounting hole 103 includes a locking hole 104 corresponding to the positioning hole 93 of the motor 90. The mounting base 100 and the motor 90 are secured together by screwing a screw 105 through the locking hole 104 into the positioning hole 93 from the internal side toward the external side. Thereafter, the mounting face 101 of the mounting base 100 is mounted on the flange 32 by screwing a screw 106 from the external side toward the internal side in place. Meanwhile, the driving shaft 92 of the motor 90 is extended into the mounting hole 82 of the second damping/positioning body 80 in a tightly clamping state for driving the cross flow fan 60 in rotational operation. In this way, a cross flow fan module 200 made by plastic material is created.

The housing 50 of the invention is integrally formed. As a result, it is not possible to fix the motor 90 from the internal side of the right side plate 30. The mounting base 100 has to be attached to the motor 90. Thereafter, the attached body is mounted on the flange 32 from the external side such that the driving shaft 92 of the motor 90 may properly fit into the mounting hole 82 of the second damping/positioning body 80 for bringing the cross flow fan 60 in rotational operation.

Moreover, a lateral fixing bar 52 is positioned between the bottom of the left side plate 20 and the bottom of the right side plate 30. Both sides of the lateral fixing bar 52 are fixed by screws 53 between the left and right side plates 20 after the cross flow fan 60 is installed in the housing 50. In this way, the whole structure of the housing 50 is strengthened.

A C-shaped indentation 56 is formed at the front and rear ends of the bottom of the left and right side plates 20, 30, respectively. A cushioning rubber pad 55 fits into the C-shaped indentation 56. Besides, a sponge pad 54 is interposed between two cushioning rubber pads 55 at the front and rear sides of the left and right side plates 20, 30.

The mounting base 100 of the motor 90 includes more than one projecting ear 108. The projecting ears 108 are fixed by screwing screws 106 into screw holes 33 at the periphery of the second mounting hole 31.

Furthermore, the mounting base 100 includes a plurality of circulation holes 107 corresponding to cooling holes 94 at the internal sides of the motor for the circulation of air.

Figure 10:
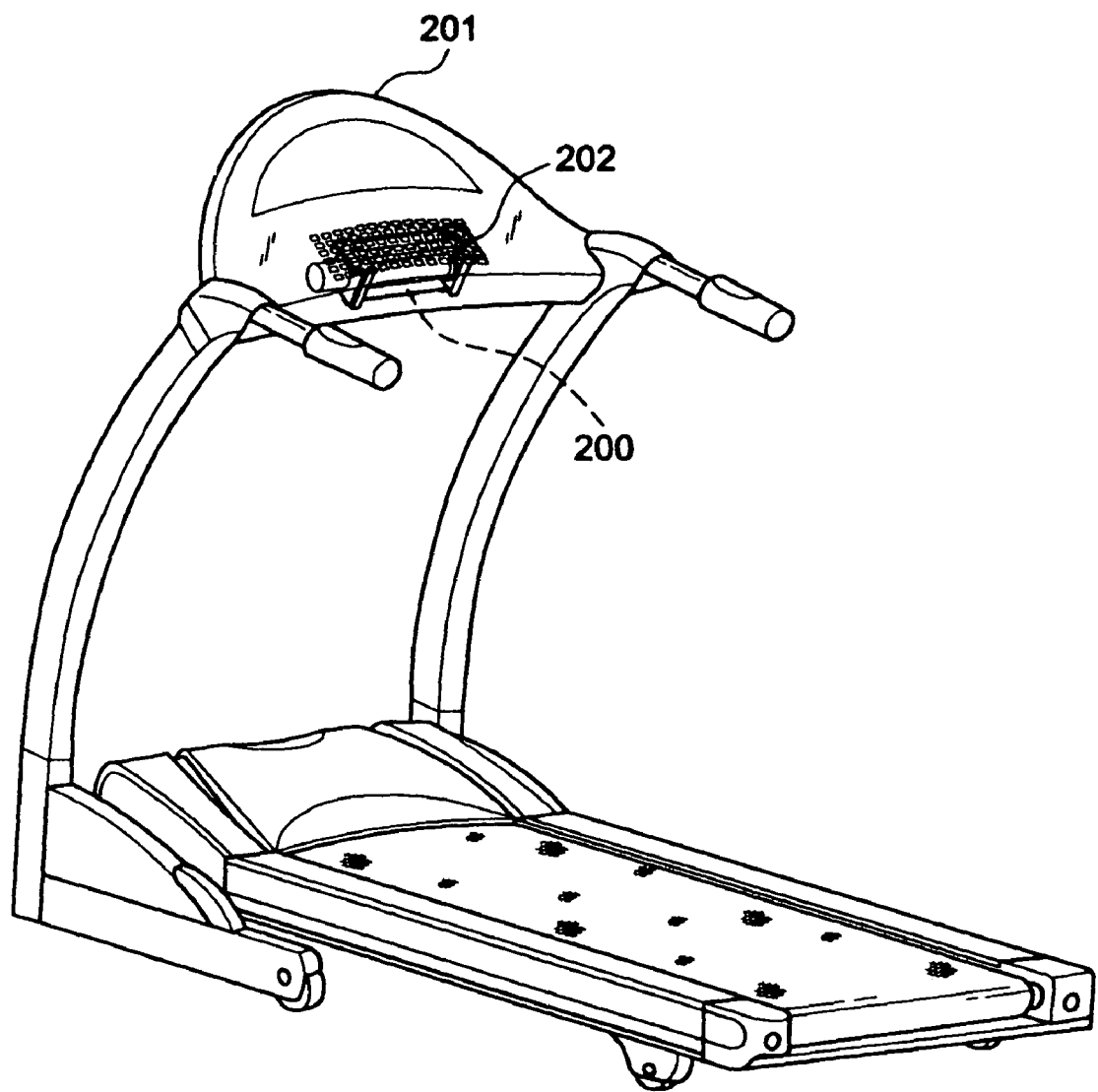
FIG. 10 shows an application of the present invention.

Based on the assembly of the above-mentioned components, the whole weight of the cross flow fan in accordance with the invention is much less than that of the conventional metal fan. However, the assembly structure is much stronger and the connecting way is much more convenient than the metal-riveting way. Therefore, an undesired deformation does not easily take place when the cross flow fan 60 is rotated in the direction of X-X (even if the length (L) of the cross flow fan 60 is slightly great). When the cross flow fan 60 is rotated in the direction of X-X, the shaft 61 is supported by the shaft sleeve 71 of the first damping/positioning body 70. The rotational force received by the shaft sleeve 71 will be absorbed by the cushioning rubber sleeve 72 enclosing the shaft sleeve 71. As a result, the rotational force is compensated for achieving an optimal damping effect. The more important is that the motor 90 is mounted by the mounting base 100 within the flange 32 of the flange 32 first. Thereafter, the driving shaft 92 is extended into the second damping/positioning body 80 to drive the cross flow fan 60. A resonance will be created so as to cause a considerable vibration if the damping configuration is badly designed since the motor 90 is a power source. Thus, the motor 90 in accordance with the invention is fixed by use of the mounting base 100 first such that the driving shaft 92 is accurately aligned to the rotational axle x-x. In this way, an off-center drawback is avoided. In other words, an undesired vibration won't take place. Moreover, a windage resistance is minimized and since the cross flow fan 60 won't easily create deformation and a smooth operation is ensured. As a result, the noise caused by wind and jitter is eliminated. As shown in FIG. 10, the cross flow fan module 200 installed within the control panel 201 of a fitness equipment produces a gas flow field flowing from the wind outlet 202 to the operator such that the operator obtains a cool wind during the exercise session. It is very practical.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A cross flow fan structure, comprising:

a) a housing integrally formed by plastic material in an injection molding process, the housing having a first side plate, a second side plate, and an L-shaped air deflector disposed between both side plates, the first side plate having a first mounting hole while the fight second side plate has a second mounting hole with a greater diameter, a flange being formed at the rim of the second mounting hole;

b) a first damping/positioning body having a shaft sleeve and a cushioning rubber sleeve, the cushioning rubber sleeve enclosing the shaft sleeve in such a way that a shaft mounting hole is exposed at an internal side of the first damping/positioning body, the cushioning rubber sleeve further having a ring groove for installation of the cushioning rubber sleeve within the first mounting hole;

c) a cross flow fan integrally formed by plastic material in an injection molding process, a first side of the cross flow fan having a metal shaft fitting into the shaft mounting hole of the shaft sleeve, a second side of the cross flow fan having a third mounting hole in an axial direction;

d) a second damping/positioning body made of rubber and tightly fitting into the third mounting hole of the cross flow fan, a flange being positioned at the external side of the second damping/positioning body while a mounting hole is provided in the axial direction;

e) a motor having a shaft holder and a projecting driving shaft at an end face thereof, at least one positioning hole being provided in the end face of the motor and radially displaced from the shaft holder;

f) a mounting base having a mounting face disposed at an internal side thereof and corresponding to the flange of the second mounting hole, an external side of the mounting base having a ring seat with an internal diameter for mounting the front part of the motor with a corresponding outer diameter, the mounting face having a mounting hole at the center thereof for mounting the shaft holder of the motor in place, the periphery of the mounting hole having a locking hole corresponding to the at least one positioning hole of the motor, the mounting base and the motor being secured together by inserting a screw through the locking hole into the corresponding positioning hole from the internal side toward the external side whereupon the mounting face of the mounting base is mounted on the flange by inserting a screw from the external side toward the internal side, the driving shaft of the motor being extended into the mounting hole of the second damping/positioning body in a tightly clamping state for driving the cross flow fan in rotational operation, whereby a cross flow fan module made by plastic material is created.

2. The cross flow fan structure as recited in claim 1 wherein a cross rib is integrally formed at the front side of the L-shaped air deflector between the first and second side plates.

3. The cross flow fan structure as recited in claim 1 wherein a lateral fixing bar is positioned between the bottom of the first side plate and the bottom of the second side plate, and wherein both sides of the lateral fixing bar are fixed by screws between the first and second side plates.

4. The cross flow fan structure as recited in claim 1 wherein a C-shaped indentation is formed at opposing ends of the bottom of the first and second side plates, respectively, and wherein a cushioning rubber pad fits into the C-shaped indentation, and wherein a sponge pad is interposed between two cushioning rubber pads of the first and second side plates.

5. The cross flow fan structure as recited in claim 1 wherein the mounting base of the motor includes more than one projecting ear, and wherein the projecting ears are fixed by inserting screws into screw holes at the periphery of the second mounting hole.

6. The cross flow fan structure as recited in claim 1 wherein the mounting base of the motor includes a plurality of circulation holes corresponding to cooling holes of the motor for the circulation of air.

\* \* \* \* \*